United States Patent [19]

Fingerson et al.

[11] Patent Number: 5,105,563
[45] Date of Patent: Apr. 21, 1992

[54] APPARATUS FOR HARVESTING AND DRYING CROPS

[75] Inventors: Conrad F. Fingerson, Chatfield; Donald W. Eickhoff, Wykoff, both of Minn.

[73] Assignee: Heartland Forage, Inc., Wykoff, Minn.

[21] Appl. No.: 550,650

[22] Filed: Jul. 10, 1990

Related U.S. Application Data

[63] Continuation-in-part of Ser. No. 377,614, Jul. 10, 1989, abandoned.

[51] Int. Cl.⁵ .............................................. F26B 19/00
[52] U.S. Cl. ...................................... 34/203; 56/16.6; 56/327.1; 56/432
[58] Field of Search .................. 34/203, 204; 56/16.4, 56/16.6, 327.1, 432; 171/127, 128, 138

[56] References Cited

U.S. PATENT DOCUMENTS

| | | | |
|---|---|---|---|
| 1,848,343 | 3/1932 | Good | 34/203 |
| 2,465,070 | 3/1949 | Demuth | 56/12.2 |
| 2,698,170 | 12/1954 | Foley | 56/12.2 |
| 2,756,554 | 7/1956 | Diehl et al. | 56/16.4 |
| 2,806,337 | 9/1957 | Rezabek | 56/16.4 |
| 2,909,881 | 10/1959 | Callahan | 56/12.2 |
| 3,111,398 | 11/1963 | Jones | 56/12.2 |
| 3,257,785 | 6/1966 | Rimes | 56/16.4 |
| 3,410,065 | 11/1968 | Martin | 56/12.2 |
| 3,512,765 | 5/1970 | Van Der Lely | 56/16.4 |
| 3,527,031 | 9/1970 | Winger | 56/14.1 |
| 3,543,488 | 12/1970 | Kowalik et al. | 56/14.1 |
| 3,545,734 | 12/1970 | Van Der Lely | 34/21.6 |
| 3,572,663 | 3/1971 | Van Der Lely | 56/16.4 |
| 3,585,730 | 6/1971 | Morse | 56/12.2 |
| 4,021,929 | 5/1977 | Black | 56/12.2 |
| 4,333,305 | 6/1982 | Cooper | 56/16.6 |
| 4,509,273 | 4/1985 | Roisen | 56/12.2 |
| 4,912,914 | 4/1990 | Wingard | 56/1 |

FOREIGN PATENT DOCUMENTS

| | | |
|---|---|---|
| 1807142 | 7/1969 | Fed. Rep. of Germany . |
| 2910375 | 9/1980 | Fed. Rep. of Germany . |
| 2911017 | 10/1980 | Fed. Rep. of Germany . |
| 2019517 | 7/1970 | France . |
| 0549405 | 11/1942 | United Kingdom .......... 34/203 |
| 1206454 | 9/1970 | United Kingdom . |

OTHER PUBLICATIONS

Farm-Mor Brochure, 4 pages with 4 pages attached, dated 1953.
International Search Report.

*Primary Examiner*—Henry A. Bennet
*Assistant Examiner*—John Sollecito
*Attorney, Agent, or Firm*—Merchant, Gould, Smith, Edell, Welter & Schmidt

[57] ABSTRACT

A harvester apparatus is provided for drying and baling forage crops in the field. The harvester apparatus includes an inlet for conveying forage crops to a dryer arrangement of the harvester where the forage crops are substantially evenly dried as they are conveyed through the dryer arrangement. The harvester apparatus includes compacting structure for compacting the forage crops before the drying process in completed. The harvester apparatus produces a layer of dried and compacted forage crops which are exited from the harvester apparatus at an exit which is adjacent a baling mechanism for securing the forage crops into bales. The layer of forage crops is converted by the baling mechanism into a column of stacked blocks secured together to form a bale.

22 Claims, 12 Drawing Sheets

FIG. 11
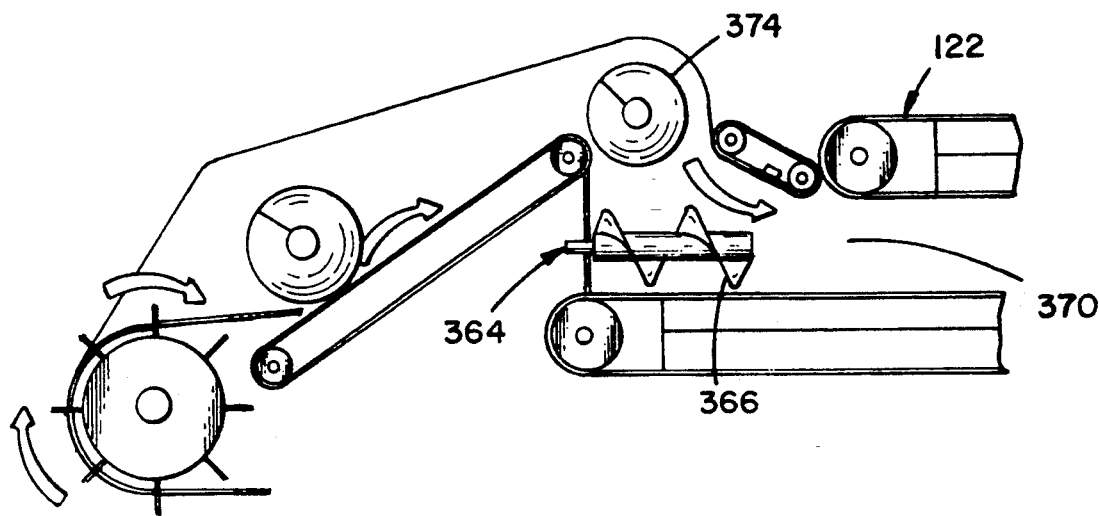
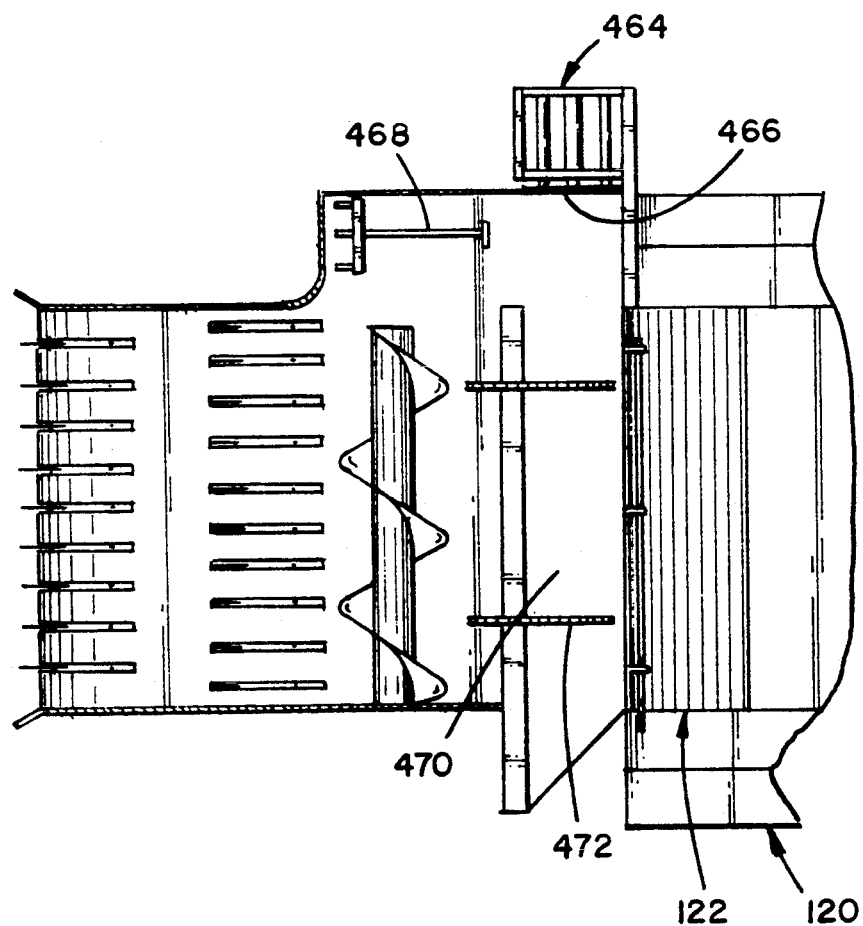
FIG. 12

APPARATUS FOR HARVESTING AND DRYING CROPS

This is a continuation-in-part of Ser. No. 07/377,614, filed July 10, 1989 now abandoned.

TECHNICAL FIELD OF THE INVENTION

The present invention relates to an apparatus for harvesting crops. More particularly, the present invention relates to an apparatus for harvesting forage crops which results in higher quality and higher quantity of yields on a consistent basis.

BACKGROUND OF THE INVENTION

The first step to producing a high quality, high yielding forage product, such as alfalfa, is good management of the soil preparation, planting and growing process, and timely harvesting. Soil preparation includes proper soil testing and fertilization. Phosphorous and potassium must be adequate to establish and maintain a forage crop. Lime applications are important for new seeding. Other important nutrients needed to foster healthy stands are nitrogen, magnesium, molybdenum, manganese, copper, etc.

Planting includes the proper selection of seed. New seed varieties have been increasing at an even greater pace. Many seed varieties address the specific needs of the environment in which they are to be used. Selection of seed varieties is often based on the following factors:

* Drainage conditions
* Soil Fertility
* pH level in the soil
* Winter hardiness
* Pest resistance
* Yield potential
* Disease resistance
* Leaf to stem ratio
* Establishment and recovery time The quality of seed used is also important. Factors such as percent of germination, percent of purity, percent of weed seed and whether or not preinoculated seed should be used, are, typically, considered.

Good soil and seed will not compensate for lack of good crop management techniques. When to seed, how to seed, and at what rate to seed, are all important in the establishment and recovery of a forage crop. Also, the number and timing of harvests directly affect the quantity and quality of the yields. For example, fields cut early nearly always result in more harvests per growing season and higher yields per growing season.

Environmental issues must also be addressed when growing forage crops. For example, the yield of forage crops will, typically, vary according to the amount of moisture received. In the case of alfalfa, four to five inches of rain are required to produce one ton per acre. Moreover, the greater the growing season, the greater the opportunity for multiple harvests.

The above are only some of the factors involved in growing high quality, high yielding forage crops. Unfortunately, even if the grower makes all the right decisions regarding the above factors and produces a high quality and high yielding crop, there is no assurance that, with existing harvesting techniques, he will be able to maintain the crop quality during harvesting and storage. There are two major reasons for this.

First, in order for forage crops to be handled, stored and shipped economically, they must be compressed into a bale form. To be stored in bale form, the harvested crop must be dried, typically in the 12% to 14% range, or treated with expensive and difficult to manage chemicals which allow storing of the crop in bale form (baling) at much higher moisture levels; e.g., 30%. Drying is typically done in the field by natural means, i.e., exposure to the sun and wind. The drying process may be aided by mechanical conditioning or crimping wherein the stalks are shredded to expose more surface area of the stalk. Typically, forage crops are cut and crimped and left to dry in windrows. They are then raked and baled. Because of the low moisture level required for baling, a substantial portion of the leaves, referred to as dry matter, are lost in the field during the drying process and/or when baling. One study has shown dry matter loss to range from 16.9% to 23.4%, depending on the type of bale made.

Second, the occurrence of rain at the time when the crop should be cut or during the field drying process, can reduce the harvest yield. The field drying process typically requires two or more days after cutting the crop and prior to baling. The probability of having two good drying days in a row was shown in one study to be 33 or 34 in 100 days. Dry matter losses due to rain during the field drying process, in one study was 23.5% to 50% depending on how heavy the rainfall.

Attempts have been made in the past to design and construct apparatus for drying and baling forage crops in the field to eliminate the problems caused by field drying under natural conditions. For example, the following patents disclose various apparatus for use in drying, and in some instances baling, various crops including forage crops. U.S. Pat. No. 1,848,343 to Good, dated Mar. 8, 1932, discloses an apparatus for drying crops such as coconut. U.S. Pat. No. 2,756,554 to Diehl et al., dated July 31, 1956, discloses a transportable forage gatherer and dryer. U.S. Pat. No. 2,806,337 to Rezabek, dated Sept. 17, 1957, discloses a transportable field hay dryer. U.S. Pat. No. 3,257,785 to Rimes, dated June 28, 1966 discloses a transportable crop handling apparatus that includes structure for drying the crops. U.S. Pat. No. 3,512,765 to Van Der Lely, dated May 19, 1970, discloses a transportable crop drying system. U.S. Pat. No. 4,912,914 to Wingard, discloses a method and apparatus for drying forage crops utilizing induction jacket rollers.

The various forage crop dryer and baler apparatus disclosed in the above-noted patents, as well as other crop harvester apparatus with similar crop dryer and baler features, have not generally been well received by the agricultural community. While the general idea of providing an apparatus for drying, and possibly baling, forage crops in the field has been known for sometime, as evidenced by the patents cited above, apparently no apparatus has been commercially successful up to this point. It is believed that the reason for the lack of success with the previous apparatus is that the apparatus have not proven very practical in operation.

Once the crops have been harvested and packaged for storage and/or transport, some problems that have arisen in the past include that the crops are sometimes difficult to transport and that the quality of the crops decreases fairly quickly during transport and storage. The result is that a significant amount of the crops are being wasted before the crops can be used or before the crops reach their final destinations. These problems are caused by a variety of sources including bulky and/or inefficient packaging, insects within the crops, and excess moisture. It is clear that there is a significant need in the world for more efficient distribution and longer term storage capability for harvested crops.

The present invention solves these and other problems which exist with existing harvesting techniques so as to improve the quality of one's harvest and does so in a manner which is believed to be commercially practicable.

SUMMARY OF THE INVENTION

One embodiment in accordance with the principles of the present invention relates to an apparatus for drying forage crops including a portable housing supported on wheels and drying structure disposed in the housing for drying forage crops. The forage crops enter the drying structure at an inlet and exit at an outlet. A conveyor apparatus passes through the drying structure and links the inlet to the outlet. The conveyor apparatus has a channel shape of decreasing cross-sectional area in a direction along the conveyor apparatus toward the outlet. The conveyor apparatus has structure for conveying the forage crops from the inlet to the outlet. This embodiment is advantageous in that the forage crops are compressed during the drying process to produce a more densely packed final product.

Another embodiment in accordance with the principles of the present invention relates to an apparatus for drying forage crops having a portable housing supported on wheels and drying structure disposed within the housing for drying forage crops. The apparatus has an inlet for feeding forage crops into the apparatus and an outlet for exiting forage crops from the apparatus. The apparatus further has conveying structure for moving the forage crops from the inlet through the drying structure to the outlet. The apparatus is provided with structure for substantially evenly distributing the forage crops as the forage crops enter the drying structure so that the forage crops have a density greater and more uniform than a density of the forage crops at the inlet. One advantage of the present embodiment is that the forage crops are more evenly distributed so that more uniform drying will occur.

A further embodiment in accordance with the principles of the present invention relates to a forage crop baling apparatus having a portable housing with an inlet and an outlet wherein forage crops enter the housing at the inlet and exit at the outlet. The forage crop baling apparatus further includes compacting structure for forming the forage crops to a continuous layer having a predetermined thickness. The forage crop baling apparatus includes cutting structure for separating a block of predetermined length from an end of the layer. The forage crop baling apparatus further has conveying structure for moving the forage crops from the inlet through the compacting structure and the cutting structure to the outlet. The forage crop baling apparatus further has guide structure for aligning and stacking each block separated from the layer. Baling structure is provided to secure a plurality of stacked blocks together to form a bail. An advantage of the present embodiment is that the resulting bales are more dense and easier to handle during transport than are conventional rectangular or round bales.

Another embodiment in accordance with the principles of the invention relates to a forage crop dryer and baler apparatus having a portable housing and drying structure provided in the housing for drying the forage crops. The forage crop dryer and baler apparatus has an inlet and an outlet and conveying structure for conveying the forage crops from the inlet through the drying structure to the outlet. The forage crop dryer and baler apparatus further has compacting structure for compacting the forage crops before the forage crops exit the drying structure. The compacting structure forms the forage crops into a single layer of predetermined thickness having a density greater than a density of the forage crops at the inlet. The forage crop dryer and baler apparatus further includes baling structure for separating the single layer into a plurality of blocks of predetermined length, stacking a predetermined number of the blocks into a column, and securing the column of stacked blocks into a bale. One advantage of the present embodiment is that the resulting bale structure is more densely packed and easier to handle than conventional bale structures.

The present invention also relates to a method of forming a bale of forage crops comprising the steps of compacting the forage crops into a layer of predetermined thickness, separating the layer into blocks of predetermined length, conveying the blocks to a common area for stacking, stacking a predetermined number of blocks into a column, and securing the column of stacked blocks together to form a single bale.

The present invention also relates to a method of harvesting forage crops comprising the steps of cutting the forage crops, drying the forage crops so as to cause a moisture loss, compacting the forage crops into a layer of predetermined thickness before the drying step is completed, separating the layer into blocks of predetermined length, stacking a predetermined number of blocks into a column, and securing the column of blocks together into a bale.

The present inventions are advantageous in that the methods and apparatus result in a more uniformly dried and more densely packed final product compared to the final products produced by conventional apparatus and methods.

BRIEF DESCRIPTION OF THE DRAWINGS

In the drawings, wherein corresponding features are designated by like reference numerals throughout:

FIG. 11 is a side view of a first alternative embodiment of an initial compactor mechanism for the harvester apparatus shown in FIG. 5;

FIG. 12 is a top view of a second alternative embodiment of an initial compactor mechanism for the harvester apparatus shown in FIG. 5;

DETAILED DESCRIPTION OF THE PREFERRED EMBODIMENTS

Figure 1:
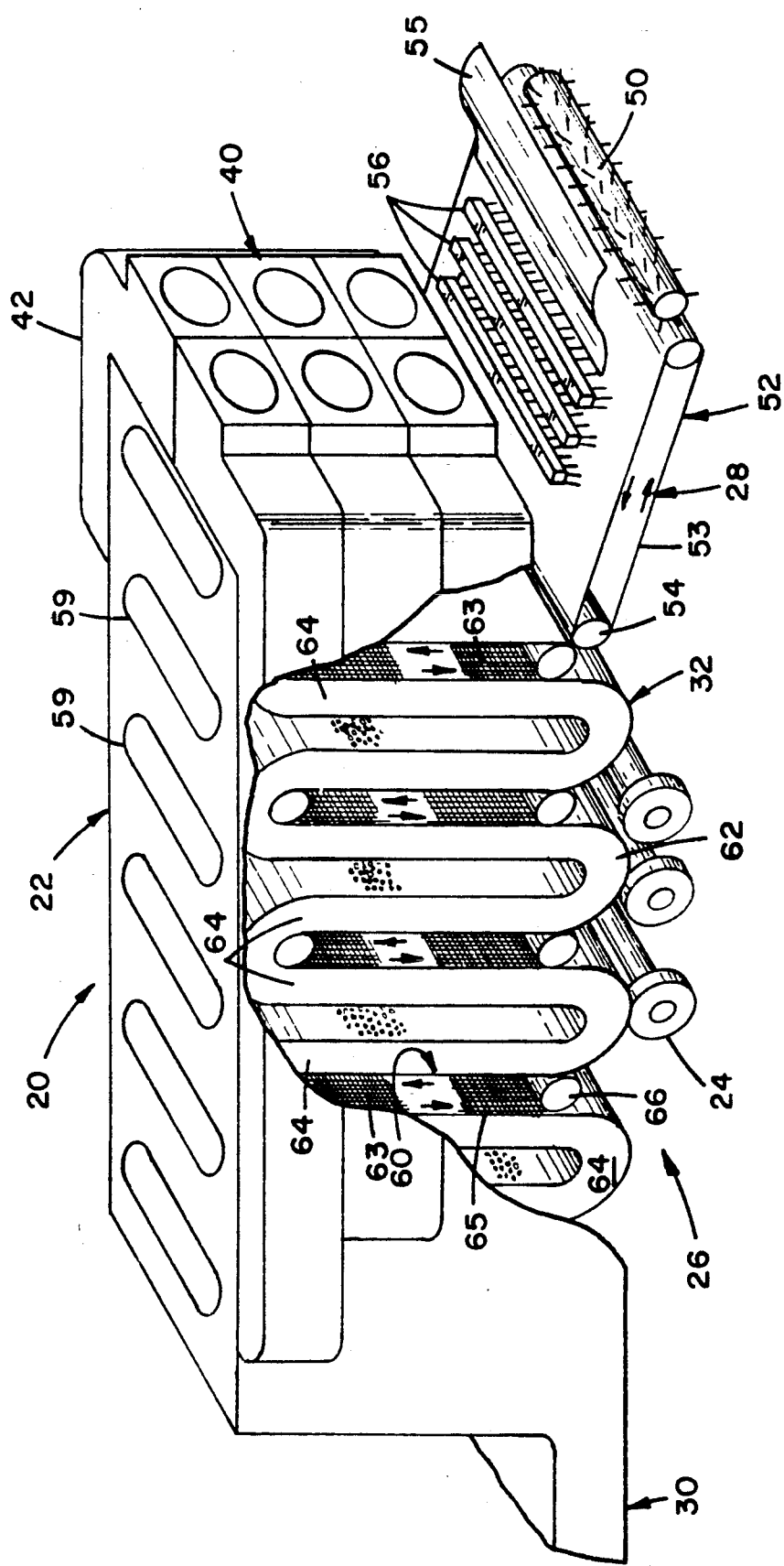
FIG. 1 is a diagrammatic, perspective view, with portions cut way, of an embodiment of a drying machine in accordance with the principles of the invention.
Figure 2:
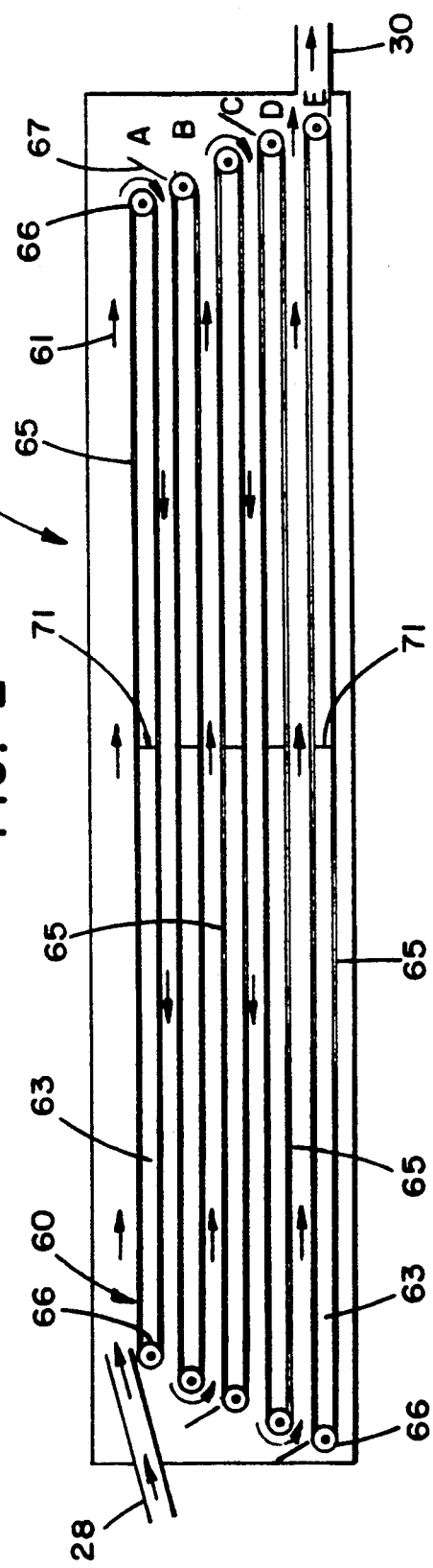
FIG. 2 is a diagrammatic view of a second alternative embodiment of the drying machine having a convoluted channel arrangement with a horizontal orientation.

Referring now to FIGS. 1 and 2, there are illustrated two embodiments of a portable drying machine in accordance with the principles of the invention generally designated by the reference numeral 20. Referring to FIG. 1, the drying machine 20 includes a housing 22 mounted on wheels 24 which support the drying machine above the surface of the ground. The embodiment of the drying machine 20 shown is intended to be pulled in a field by a primary mover such as a tractor, the drying machine including a conventional hitch arrangement (not shown) to enable interconnection to the primary mover. It will be appreciated that the drying machine 20 might be self-propelled so that the use of a primary mover is not required.

Figure 3:
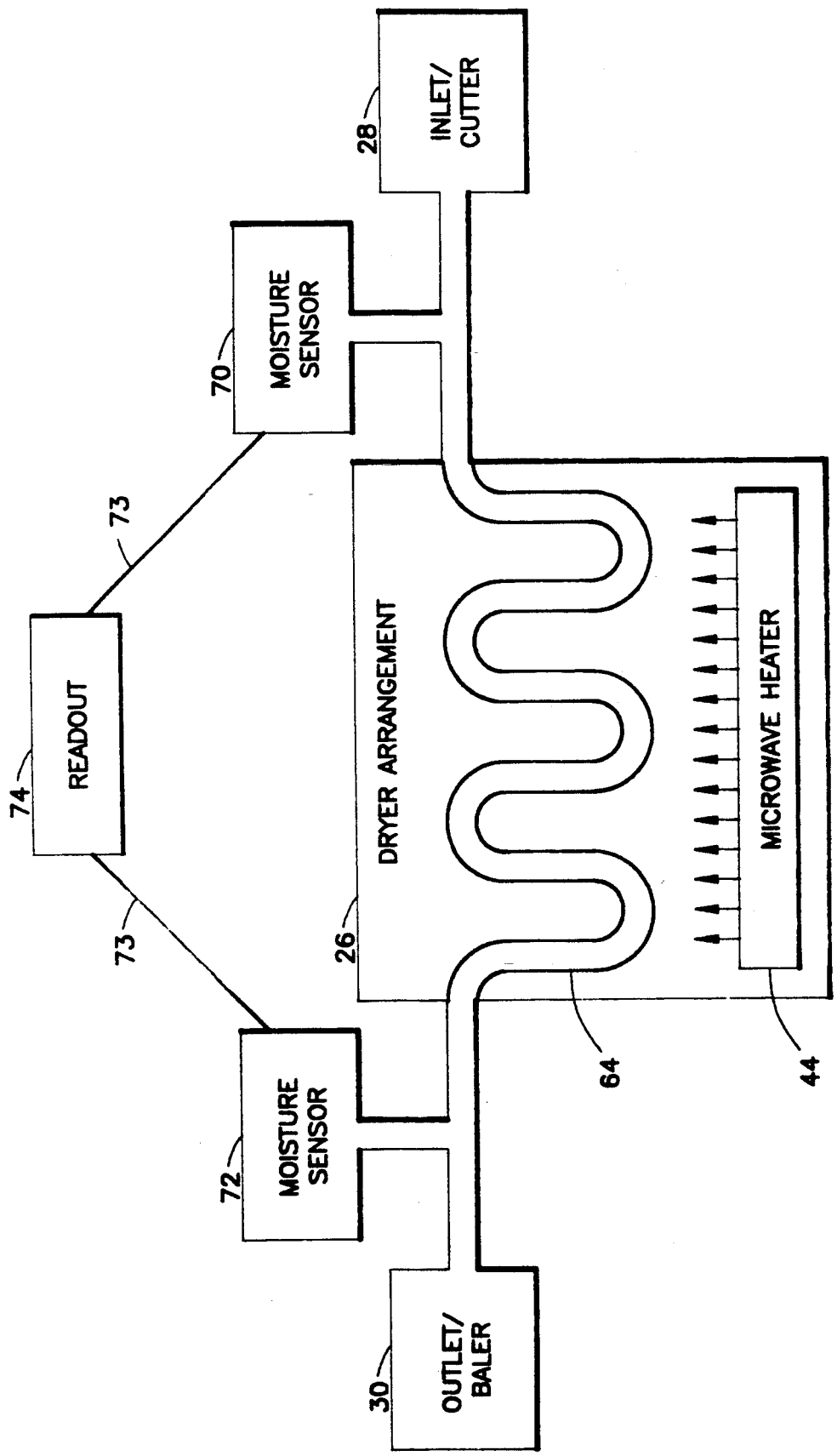
FIG. 3 is a block diagram of a third alternative embodiment of the present invention including a microwave dryer.

The drying machine 20 includes a dryer arrangement 26 for drying the forage crops. An inlet 28 is disposed proximate a first end (front end) of the drying machine 20 for feeding forage crops into the dryer arrangement 26, and an outlet 20 is disposed proximate an opposite second end (back end) of the drying machine 20 for exiting forage crops from the dryer arrangement 26. The dryer arrangement 26 includes a conveyor system 32 for conveying forage crops from the inlet 28 through the dryer arrangement 26 to the outlet 30. In the embodiment shown, the outlet 30 simply delivers the dried forage crops to the surface of the field. The dried forage crops are then subsequently baled. It will be appreciated that in alternate embodiments and as illustrated in FIG. 3, the drying machine 20 might include a baling function proximate the outlet 30 for baling the forage crops after they have been dried. The embodiment of the drying machine 20 shown is intended to pick-up forage crops after they have been cut and windrowed. However, alternate embodiments of the drying machines might include a cutting function proximate the inlet 28 for cutting forage crops.

In the embodiment shown, the dryer arrangement 26 uses a hot air system comprising a plurality of gas burners/fans 50 and a plurality of ducts 42 for forcing the heated air from the burners/fans 40 into spaced apart locations in the dryer arrangement 26. It will be appreciated that alternative sources of heat might be utilized and still be in keeping with the principles of the invention. For example, as diagrammatically illustrated in FIG. 2, microwave heaters 44 might be used in the dryer arrangement 26 to dry the forage crops.

The embodiment of the inlet 28 of the drying machine 20 shown includes a pick-up head 50 which is disposed proximate a conveyer 52 for conveying the forage crops picked up by the pick-up head 50 into the dryer arrangement 26. In the embodiment shown, the conveyor 52 includes a belt 53 and pulleys 54. Shielding 55 is disposed over the conveyor 52. In the embodiment shown, a forage crop lever arrangement 56 is disposed intermediate the shielding 55 and the conveyor 52 for evenly distributing the forage crops across the surface of the conveyor 52.

In the embodiment shown, the dryer arrangement 26 includes a wire mesh conveyor belt system 60 and perforated sheet metal 62 cooperating to define a convoluted channel arrangement 64 along 26 during the drying process. In the embodiment shown in FIG. 1, the convoluted channel arrangement 64 has a vertical orientation, although it will be appreciated that the channel arrangement 64 may take on other orientations, such as a horizontal orientation as generally illustrated in FIG. 2. The conveyor belt system 60 is comprised of individual continuous belts 65 with pulleys 66. The sheet metal 62 is disposed relative to the individual belts 65 and pulleys 66 to form the continuous convoluted channel arrangement 64. It will be appreciated that the specific structure of the channel arrangement 64 may take on any number of configurations. In the embodiment shown, the convoluted channel arrangement 64 has a spacing of roughly one (1) foot with a width of nearly eight (8) feet with the vertical sections having a height of nearly twelve (12) feet. The total length of the convoluted channel arrangement 64 is roughly one-hundred (100) feet. The overall dimensions of the embodiment of the drying machine 20 shown are eight (8) feet wide, twelve and one/half (12½) feet high, and thirty five (35) feet long.

In the embodiment of the drying machine 20 shown, the ducts 42 direct heated air into a space 63 defined by the individual wire mesh belts 65 and their associated pulleys 66. Thus heated air flows from this space and into portions of the convoluted channel arrangement 64 on either side of the space 63. Also, in the preferred embodiment shown, vents 59 are provided in the top of the housing 22 to allow air flow from the housing 22.

In the embodiment shown in FIG. 2, the drying machine 20 is roughly six (6) to eight (8) feet wide, thirty (30) feet long, and eight (8) to ten (10) feet high. Preferably the conveyor belt system 60 has variable speeds and adjustable heights between belts 65. By adjusting the speed of the belts, the forage crops can be stretched uniformly or compressed along the longitudinal axis of the drying machine 20. Indeed, the direction of belt movement might even be reversible to aid in providing a uniform distribution of the forage crops along the conveyor. Sensors might be utilized to sense the uniformity of distribution and control movement of the belts 65 accordingly. By adjusting the spacing between the belts 65, the height of the forage crops being conveyed can be compressed. The direction of the forage crop as they are being conveyed is generally indicated by arrows 61. Hot air is blown in from the sides by blowers (not shown). The blowers might be located in alternate locations and blow hot air the full or partial length of the drying machine 20. The forage crops are rotated when falling from one level to the next so as to expose an opposite side of the forage crops to the hot air. Deflectors 67 are present proximate the ends of the belts 65 to deflect the forage crops onto the belt 65 immediately below each level of belts 65. The letters A, B, C, D, and E represent air vents. A, C, and E are vents forcing hot drying air into the dryer arrangement 26 in the space defined between the conveyor belts 65 and their pulleys 66. Vents B and D vent out or exhaust air. As illustrated, a partition 71 may extend transversely of the drying machine in the space defined between the belts 65 so as to partition off the drying machine into two sections. A second set of vents A, B, C, D, and E might be located on the other side of the partition 71 so as to provide for a total of ten vents. The hot air vents are preferably controlled so as the forage crops travel along the conveyor belts 65 the temperature is decreased. At the final vent, represented by E, air at roughly ambient temperature is preferably blown onto the forage crops.

Assuming a one (1) foot thick distribution of forage crops along the conveyor belts 65 of a drying machine 20 being six (6) feet wide, twenty (20) feet long, and having five (5) convolutions of channels as illustrated in FIG. 2, the drying machine 20 has a 600 cubic foot capacity. At a density of seven pounds per cubic foot, there is a total forage crop weight of 4200 pounds or 2.1 ton in the drying machine at any give time. To dry one acre with a twenty foot wide swath requires a swath 2,178 feet long or 0.4125 miles. To cover 100 acres, the drying machine must travel 41.25 miles. To cover this in ten (10) hours, the drying machine 20 must travel 4.125 miles per hour, which is a reasonable speed. If one gets 200 ton per 100 acres, one would process 95 loads through the drying machine in ten (10) hours or a rate of 6.3 minutes per load. If there is 100 linear feet in the drying machine 20, it would need to travel roughly 16 feet per minute or about twenty two (22) times slower than the ground speed. This will facilitate in compressing the forage crops into the conveyor.

A preferred embodiment of the drying machine 20 of the present invention might include variable drying capability so as to allow harvesting of forage crops which have variable amounts of moisture content than another field. Moreover, the moisture content within a give field might vary. As illustrated in FIG. 3, a preferred embodiment of the present invention might also include a moisture sensor 70 proximate the inlet for sensing the moisture of the forage crops prior to drying and/or a moisture sensor 72 proximate the outlet for sensing the moisture content of the forage crops after they have been dried. The moisture sensor(s) 70,72 are preferably electrically interconnected by electrical conductors 73 to a readout device 74 located on the primary mover or on the drying machine, if self-propelled, where the user can readily monitor the moisture content of the forage crops. Depending on whether the moisture content was too low or too high, the drying capability of the various operational parameters such as the temperature of the heated air, the heated air flow, the speed with which the forage crops are continuously conveyed through the convoluted channel system 64, the speed at which the drying machine 20 is moving, etc.

In operation, the drying machine is pulled or self-propelled in the field with its inlet 28 picking up forage crops and feeding them into the dryer arrangement 26.

The dryer arrangement 26 drys the forage crops as they are continuously conveyed through the convoluted channel system 64. The outlet 30, in turn, delivers the dried forage crops to the ground or a baler for baling. This inlet, drying, and exit functions will occur concurrently in the preferred embodiment such that the drying machine 20 can continuously move along the field during this process. Although, the preferred embodiment of the drying machine is mobile, it will be appreciated that the drying machine might remain stationary during the drying process with cut forage crops being delivered to the drying machine 20. In such an embodiment, the drying machine 20 is still preferably portable so that it can be moved to the field site where harvesting is occurring.

Figure 4:
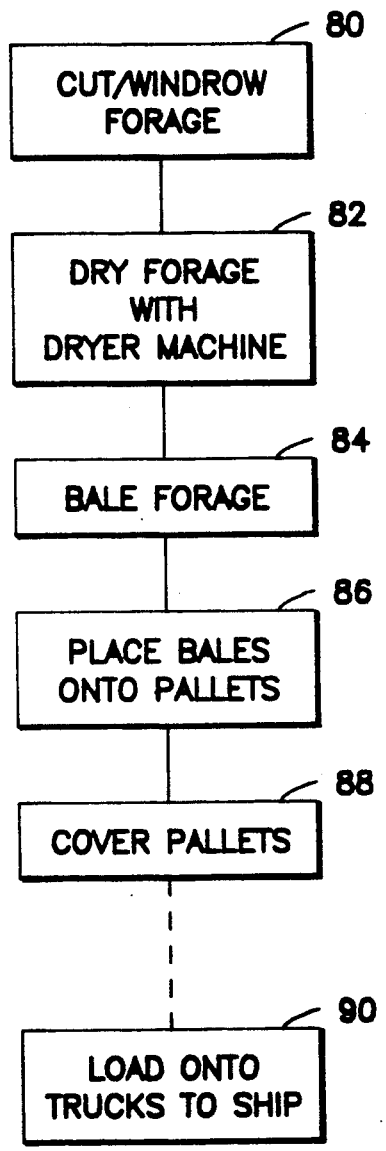
FIG. 4 is a block diagram illustrating an embodiment of a method in accordance with the principles of the present invention.

As illustrated in FIG. 4, according to an embodiment of a method of the present invention, when forage crops are cut at 80 they have a relatively high moisture content. The cut forage crops are then machine dried at 82 shortly thereafter, without significant natural field drying occurring, by the use the portable drying machine 20 which is towed in the field by a primary mover or self-propelled in the field. In the preferred method, the forage crops are dried 40% or more to a moisture content of less than 20%. After drying, the forage crops are suitably packaged for handling, shipping and storage.

In one embodiment this involves at 84 baling the forage crops into conventional bale configurations at roughly a density of twenty (20) pounds/cubit foot. For shipment, at 86 the bales are then placed on large, durable and reusable eight foot by eight foot (8' × 8') pallets. Bales may be stacked several feet high; e.g., seven (7) or eight (8) feet or more. The pallets are then covered at 88 by weather resistant, long life, flexible covers to protect the forage crops from the weather, thereby eliminating the need for expensive sheds and expensive hauling. The pallets will then be moved to a desired location for storage or loaded onto truck beds 90 for shipment, by use of conventional fork lifts.

Further improvements have been made to the embodiments of the portable drying machine 20 disclosed in detail above and illustrated in FIGS. 1-4. The description which follows provides a detailed description of the improvements made to the drying machine previously disclosed. Figures 5-16 illustrate several embodiments of an improved drying machine or harvester 100 in accordance with principles of the present invention. In addition to producing a greater percentage of the growing crop harvested, it is believed that the improvements result in the production of a higher quality, higher density, and more uniformly dried product than conventional apparatus designed to dry and bale forage crops in the field.

Figure 5:
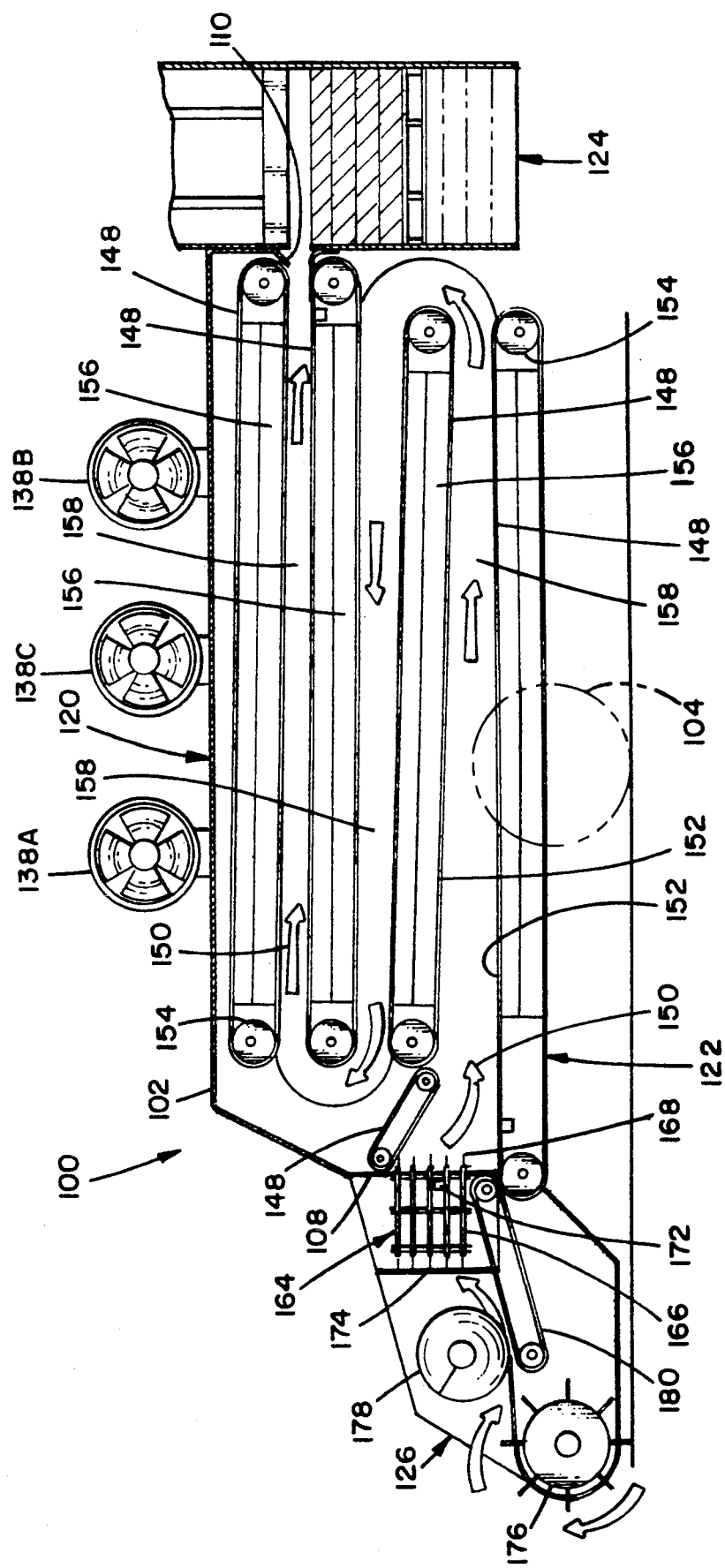
FIG. 5 is a diagrammatic side view, with portions cut away, of an improved fourth preferred embodiment of a harvester apparatus in accordance with the principles of the invention, with arrows indicating the path of forage crops through the harvester apparatus.
Figure 6:
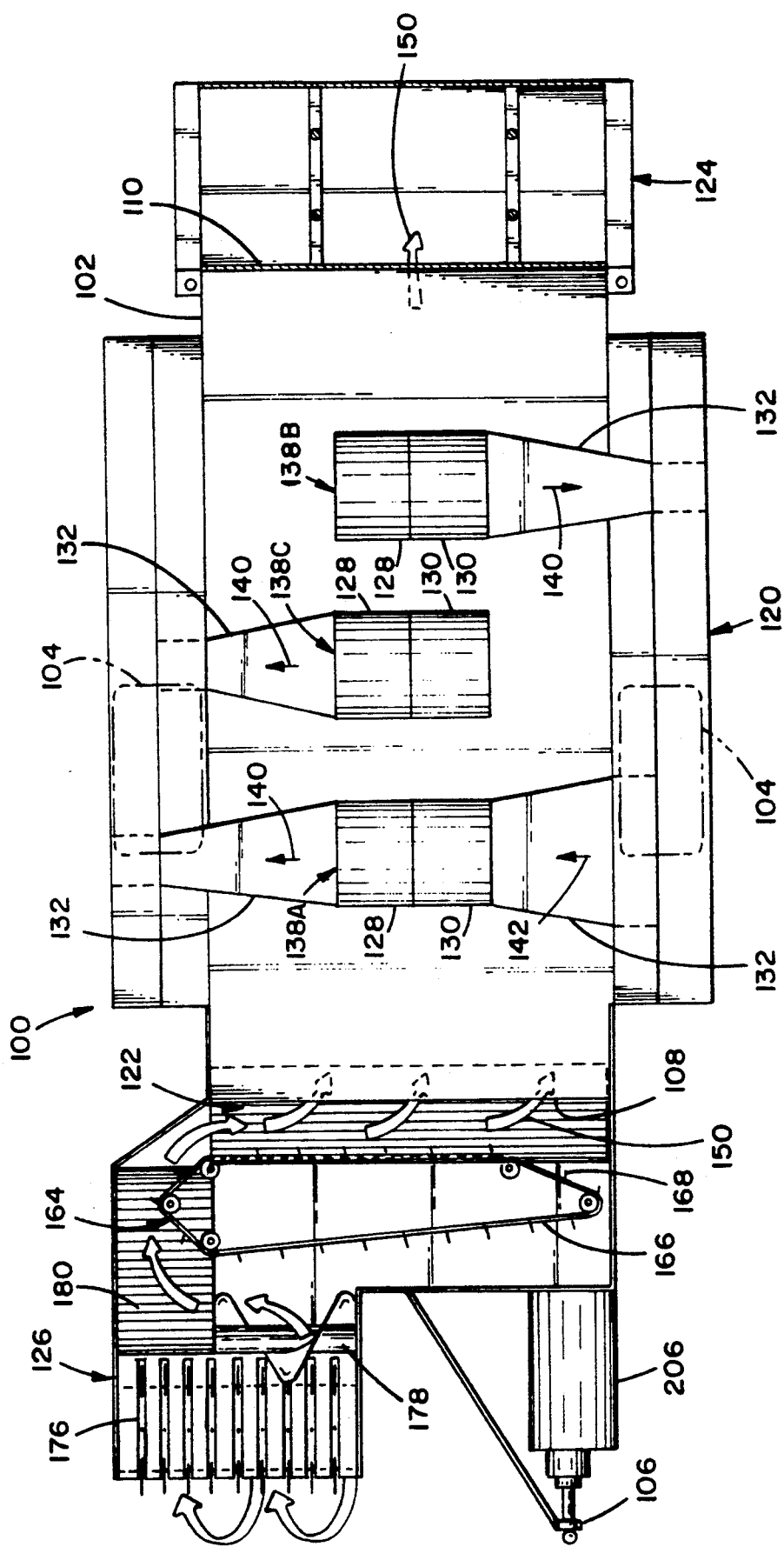
FIG. 6 is a top view of the harvester apparatus shown in FIG. 5, with arrows indicating the path of air to and from the unit heaters.

Referring now to FIGS. 5 and 6, the improved fourth preferred embodiment of the drying machine or harvester 100 is shown having a housing 102 mounted on wheels 104 which support the harvester above the surface of the ground. The harvester shown is intended to be pulled in a field by a primary mover such as a tractor. As shown in FIG. 6, the harvester includes a conventional hitch arrangement 106 to enable interconnection to the primary mover. It will be appreciated that the harvester 100 might be self-propelled so as to eliminate the need for a primary mover.

The harvester 100 includes a dryer arrangement 120 for drying forage crops. An inlet 108 is disposed proximate a first end (frond end) of the harvester 100 for feeding forage crops into the dryer arrangement 120.

An outlet 110 is disposed proximate an opposite end (back end) of the harvester 100 for exiting forage crops from the dryer arrangement 120. A conveyer arrangement or conveyer apparatus 122 moves the forage crops from the inlet 108 through the dryer arrangement 120 to the outlet 110.

In the embodiment shown in FIG. 5 and FIG. 6, the forage crops exit the outlet and are delivered to a baling mechanism 124 located a the back end of the harvester 100. The baling mechanism 124 packages the dried forage crops into individual bales for storage and/or transport. It will be appreciated that the harvester 100 may be employed without the baling mechanism 124, wherein the harvester 100 would deliver the dried forage crops to the surface of the field.

The harvester 100 shown in FIGS. 5 and 6 includes a pick-up mechanism 126 for picking up the forage crops from the surface of the field and delivering the forage crops to the inlet 108. While the harvester 100 shown is intended to pick up the forage crops from the surface of the field using the pick-up mechanism 126, alternate embodiments of the harvester might include a cutting apparatus proximate the front end of the harvester for cutting forage crops.

The dryer arrangement 120 dries the forage crops which enter the housing at the inlet 108 such that the forage crops that exit the housing at the outlet 110 have a reduced moisture content. The dryer arrangement 120 of the preferred harvester 100 uses a hot air system comprising a plurality of unit heaters 138A, 138B, 138C having burners 128 and blowers or fans 130 as shown in FIG. 6. In the preferred embodiment, the unit heaters are conventional farm dryers, as used on corn or in other drying applications. The burners 128 of the unit heaters 138 are preferably liquid propane type burners. However, various other sources of fuel are anticipated for heating the air for drying. The unit heaters 138 heat fresh air or air recirculated from the dryer arrangement 120 or a variable combination of both. The fans 130 force air heated by the burners 128 through duct 132 into spaced apart locations in the dryer arrangement 120. The arrows 140, 142 illustrate the path of the air from and to the unit heaters, respectively. In the preferred harvester 100, the unit heaters 138 are the type which can be adjustably controlled for air temperature and possibly fan speed. Preferably, the unit heaters 138 are individually controlled for temperature such that the unit heaters 138 are capable of producing heated air at different temperatures. In this manner, the amount of heating of the forage crops can be controlled to achieve optimal drying. It will be appreciated that alternative sources of heat might be utilized and still be in keeping with the principles of the present invention. For example, microwave heaters (not shown) might be used in the dryer arrangement 120 to dry the forage crops. In addition to drying the forage crops, the heated air will kill many of the insects in the forage crops if heated to a sufficiently high temperature (i.e. 150–160 degrees Fahrenheit).

In the fourth preferred embodiment, the conveyor apparatus 122 comprises a plurality of endless conveyor belts 148. The conveyor belts 148 move the forage crops from the inlet 108 through the housing 102 and the dryer arrangement 120 to the outlet 110 such that the forage crops are dried during transport. The conveyor belts 148 define a conveyor path or channel 158 for the passage of the forage crops through the housing 102. To conserve space, the channel 158 has a convoluted shape with a general horizontal orientation. The convoluted shape can have various other shapes including a similar convoluted shape having a general vertical orientation. Flow arrows 150 indicate the path of the forage crop through the housing 102. In the fourth preferred embodiment, the conveyor belts 148 are variable speed controlled. It should be appreciated that any number of conveyor belts could be employed to move the forage crops through the harvester. It should be noted that conveyor apparatus is of sufficient length and the speed sufficiently slow that drying times may exceed an hour or more from inlet to outlet.

Figure 7:
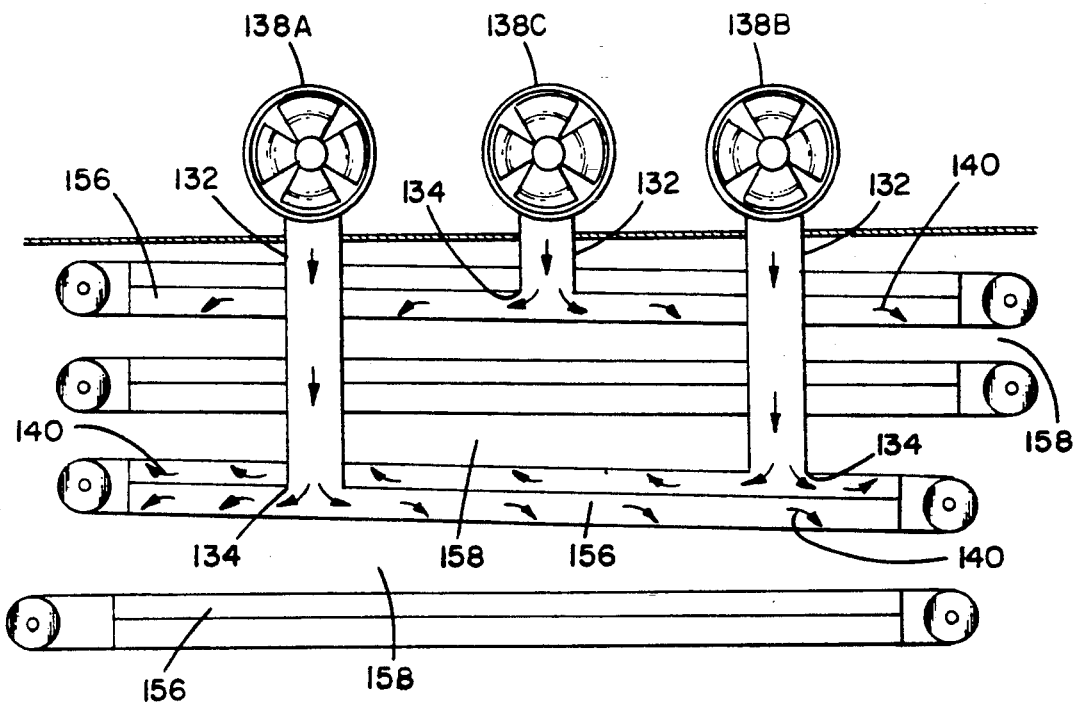
FIG. 7 is a side view of the harvester apparatus shown in FIG. 5, with arrows showing the path of heated air through the harvester apparatus.

The conveyor belts 148 are comprised of slats attached to chains 152 and pulleys 154. The conveyor belts 148 define a space 156 between opposite sides of each wire mesh belt. The conveyor belts 148 are sufficiently porous to permit the passage of airflow. In the preferred embodiment, air heated by the unit heaters 138 is transported through duct 132 to the space 156 at various locations in the conveyor apparatus 122. As shown in FIG. 7, heated air vents 134 connect the duct 132 to the space 156. During the drying process, heated air that enters the space 156 through the heated air vents 134 is directed by structure provided in the space 156 and the sides of the housing 102 such that the heated air flows through the conveyor belts 148 and across the channel 158 wherein the heated air contacts and dries the forage crops. FIG. 7 also illustrates the path of the heated air from the unit heaters 138 to the heated air vents 134 through the space 156 and across the conveyor belts 148 the channel 158 shown by arrows 140.

Figure 8:
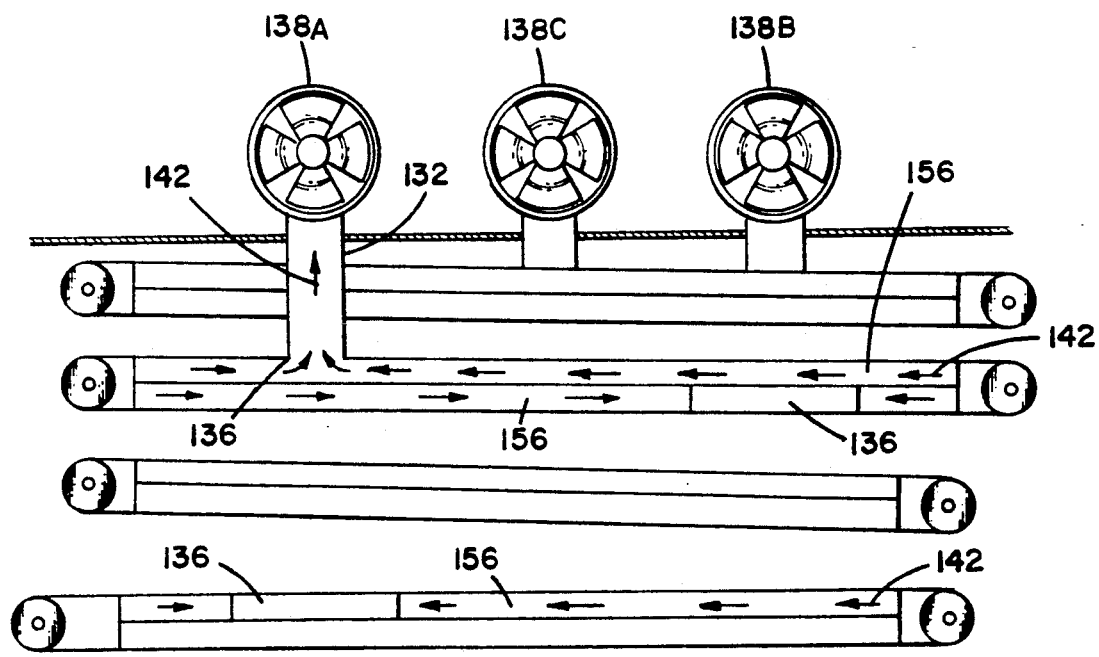
FIG. 8 is a side view of the harvester apparatus shown in FIG. 5, with arrows showing the path of exhaust air through the harvester apparatus.

In the preferred embodiment, the air that passes through the forage crops then travels through the conveyor belts 148 on the opposite side of the channel 158. As shown in FIG. 8, the air then enters the space 156 where the air is exhausted through exhaust air vents 136 to the atmosphere or recirculated to the unit heaters 138. As shown in FIG. 6 and FIG. 8, some of the air from the housing is exhausted to the atmosphere while some is exhausted and recirculated. Recirculation of exhaust air to the unit heaters 138, it is believed, will increase the efficiency of the drying process. FIG. 8 illustrates the path of the exhaust air from the forage crops through the conveyor belts 148 to the space 156 to the exhaust air vents 136 shown by arrows 142.

In the preferred embodiment, it is believed that optimal drying of the forage crops will occur if the unit heaters 138 are maintained at different temperatures, with the highest moisture forage receiving the warmest air and the lowest moisture or driest forage receiving the coolest air. For example, unit heater 138A would produce air heated to the highest temperature, unit heater 138B would produce air heated to a lesser temperature, and unit heater 138C would produce air at the coolest temperature. In some instances, unit heater 138C may not heat the air at all and merely provide ambient air to the housing. In this manner, the greatest heat is applied while the forage crop is still soft and pliable just after the forage crop enters the dryer arrangement 120. The heat is reduced until, at the end of the drying process air heated by unit heater 138C which is at ambient or slightly above ambient is applied to the forage crops.

In the fourth preferred embodiment shown, the harvester 100 has structure for compacting the forage crops before the drying process is completed. It is believed that a higher quality and more densely packed final product will result if compaction occurs before the drying process is completed than that produced by conventional harvester apparatus. It is believed that compaction before the drying process is over to produce a better end product can be accomplished in two ways, either singly or in combination. One way is to provide the harvester 100 with structure for initially compacting the forage crops while the forage crops are moist and pliable before the forage crops enter the dryer arrangement 120. Another way is to provide the harvester 100 with structure for compacting the forage crops during the drying process as the forage crops pass through the dryer arrangement 120. The fourth preferred embodiment shown preferably includes both types of structures.

For initially compacting the forage crops before the forage crops enter the dryer arrangement 120, an initial compactor mechanism 164 is provided between the inlet 108 and the dryer arrangement 120. The initial compactor mechanism 164 compacts the forage crops so that the forage crops have a density greater than a density of the forage crops at the inlet 108.

In addition, the initial compactor mechanism 164 also functions to substantially evenly distribute the forage crops to produce a density which is more uniform than the density at the inlet 108. The initial compactor mechanism 164 compensates for the problems caused by unevenly distributed forage crop in the field and unevenly distributed crops in the dryer arrangement 120, namely unevenly dried forage crops. Unevenly dried forage crops can result in a lower quality product, because any excessively moist spots in the final product are subject to decay during long term storage. It is believed that a more uniformly dried product results if the forage crops are evenly distributed during the drying process. It is also believed that a more dense product results if compaction begins when the forage crops are moist and pliable as they are when they enter the inlet. The initial compactor mechanism 164 has structure for accomplishing both of these functions.

In the preferred embodiment, the initial compactor mechanism 164 shown in FIGS. 5 and 6 includes a distribution conveyor belt 166 travelling transversely to the path of the conveyor belts 148. The distribution conveyor belt 166 includes a plurality of fingers or prongs 168 for engaging the forage crops as they enter the housing. The prongs 168 transfer the forage crops to an initial compacting area 170 where the forage crops accumulate to a predetermined density. The prongs also more uniformly distribute the forage crops to facilitate more uniform drying. In the preferred embodiment, a sensor 172 is provided on the distribution conveyor belt 166 to detect the approximate density of the forage crops in the initial compacting area 170. The sensor 172 might include a spring loaded plate which would detect the density of the forage crops in the initial compacting area 170. The sensor 172 is linked to the conveyor belts 148 and possibly the distribution conveyor belt 166 such that a more uniformly dense stream of forage crops will enter the dryer arrangement 120. The sensor operates to control the speed of the conveyor belts 148 and the distribution conveyor belt 166 such that if an insufficient amount of forage crops are entering the inlet 108, the sensor will activate to slow down the belts. If too much forage crops are entering the inlet, the sensor will activate to speed up the belts.

The structure provided by the harvester 100 to compact the forage crops during the drying process is part of the conveyor apparatus 122. As shown in FIG. 5, the individual conveyor belts 148 are positioned such that the channel 158 between the conveyor belts 148 has a decreasing cross-sectional area in a direction of the conveyor apparatus 122. As the forage crops are transported through the dryer arrangement 120, the forage crops are compacted to a smaller area between the conveyor belts. In this manner, the forage crops are compacted during the drying process. It is to be appreciated that the taper of the channel 158 may decrease at different rates as the forage crops travel through the dryer arrangement 120.

As noted above, the preferred embodiment of the harvester 100 illustrated in FIGS. 5 and 6 includes structure for initially compacting the forage crops before the forage crops begin the drying process and structure for compacting the forage crops during the drying process. The harvester 100 produces a continuous layer of dried and compacted forage crops having a predetermined thickness at outlet 110. The layer has a generally rectangular cross-sectional shape. It is believed that through the use of the harvester 100 shown in the Figures and described herein, a 75% reduction in volume and a 40% reduction in moisture content is possible for the forage crops at the outlet 110 compared to at the inlet 108. It is anticipated that a final moisture content as low as 13% is possible. Further, it is believed the harvester 100 produces a more uniformly dried and a more densely packed final product than is capable of being produced by conventional harvesters. It is believed that densities up to 20 pounds per cubic foot are possible using the principles of the present invention.

FIG. 11 illustrates a first alternative embodiment of an initial compactor mechanism 364 for compacting forage crops in an initial compacting area 370. The initial compactor mechanism 364 includes a longitudinal auger 366 which moves the forage crops from a distribution auger 374 in a direction toward the conveyor apparatus 122 and the dryer apparatus 120. The longitudinal auger moves the forage crops to compact the forage crops in the initial compacting area 370 before the forage crops enter the dryer arrangement 120. Preferably the initial compactor mechanism 364 would include a plurality of longitudinal augers 366, running parallel to each other in the same plane. In that case, the distribution auger 374 spreads the forage crops evenly across the longitudinal augers.

FIG. 12 illustrates a second alternative embodiment of an initial compactor mechanism 464 for initially compacting the forage crops in an initial compacting area 470. Whereas the previously described initial compactor mechanisms 164, 364 continuously compact the forage crops, initial compactor mechanism 464 compacts the forage crops incrementally. A reciprocating plate 466 moves forage crops fed to it by a reciprocating fork 468 toward the initial compacting area 470 in a container 472. When a predetermined density has been achieved in the container 472, the container moves the compacted unit or block of forage crops within the container to the conveyor apparatus 122 to enter the dryer apparatus 120. Once the container 472 places the unit of forage crops onto the conveyor apparatus, the conveyor apparatus is typically stopped such that the reciprocating plate can fill the container again. The result is to form a continuous chain of blocks of forage crops in the dryer arrangement 120 with no spacing between the blocks.

Figure 13:
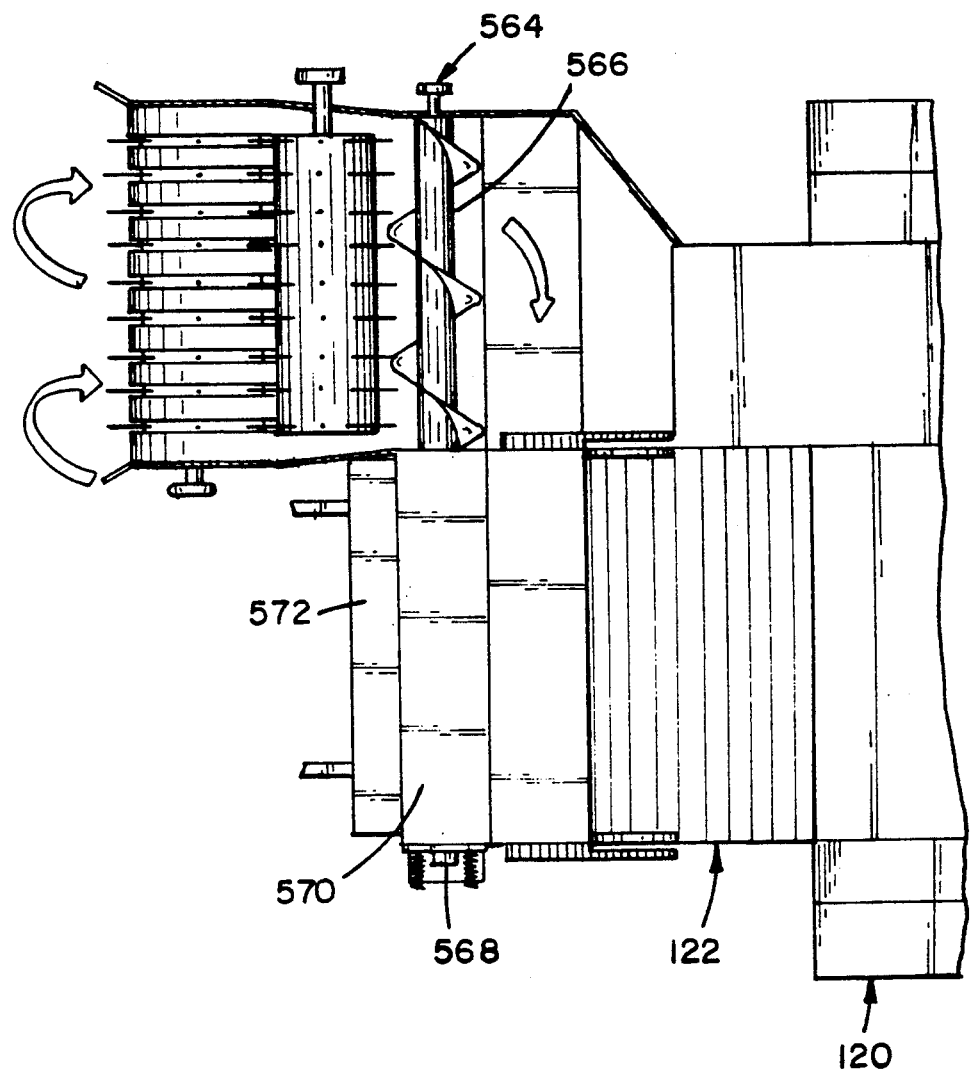
FIG. 13 is a top view of a third alternative embodiment of an initial compactor mechanism for the harvester apparatus shown in FIG. 5.

FIG. 13 illustrates a third alternative embodiment of an initial compactor mechanism 564 for compacting forage crops in an initial compacting area 570. A transverse auger 566 fills the initial compacting area 570 with forage crops. Once a predetermined density has been sensed by a sensor 568, a ram 572 moves the unit or block of forage crops to the conveyor apparatus 122 to enter the dryer arrangement 120. Like the second alternative embodiment shown in FIG. 12, the third alternative embodiment also incrementally compacts the forage crops in the initial compacting area 570. To keep the resulting blocks close together, the conveyor apparatus 122 is stopped once the ram 572 moves the block onto the conveyor belt and not started until the ram is ready to push another block onto the conveyor apparatus.

The pick-up mechanism 126 disposed on the front end of the harvester 100 shown in FIG. 5 and 6 includes a toothed pick-up head 176 for picking up the forage crops from the surface of the field. The pick-up head 176 transfers the forage crops to a feed auger 178 which transfers the forage crops to a feed belt 180. As shown in FIG. 5 and FIG. 6, the feed belt 180 supplies the forage crops to the distribution conveyor belt 166 for initial compaction before the forage crops enter the dryer arrangement 120. As shown in FIG. 6, the forage crops travel from the pick-up head 176 to the distribution conveyor belt 166 by passing through a small area adjacent one side of the harvester 100. It is to be appreciated that various other pick-up mechanisms 126 could be provided other than the one shown which would provide the forage crops to the inlet for initial compacting by the initial compactor mechanism 164, or other initial compactor mechanisms like those disclosed herein. Such pick-up mechanisms 126 might include structures with dual feed belts and structures having a straight path from the pickup head 176 to the inlet 108.

Figure 9:
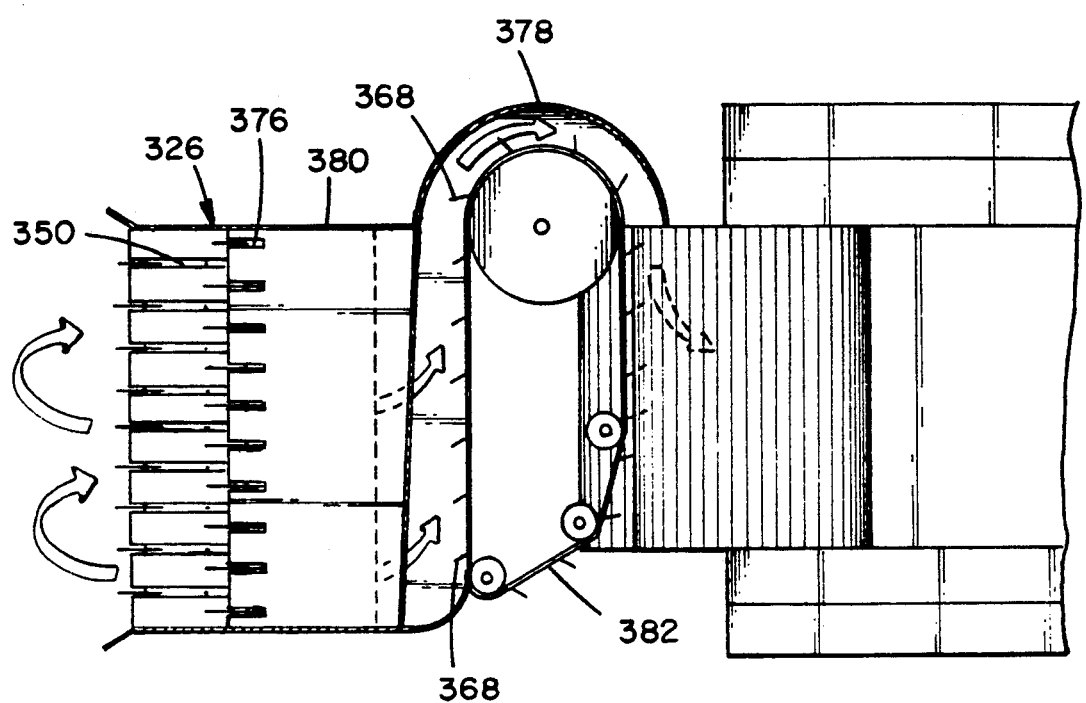
FIG. 9 is a top view of a first alternative embodiment of a pick-up mechanism for the harvester apparatus shown in FIG. 5.
Figure 10:
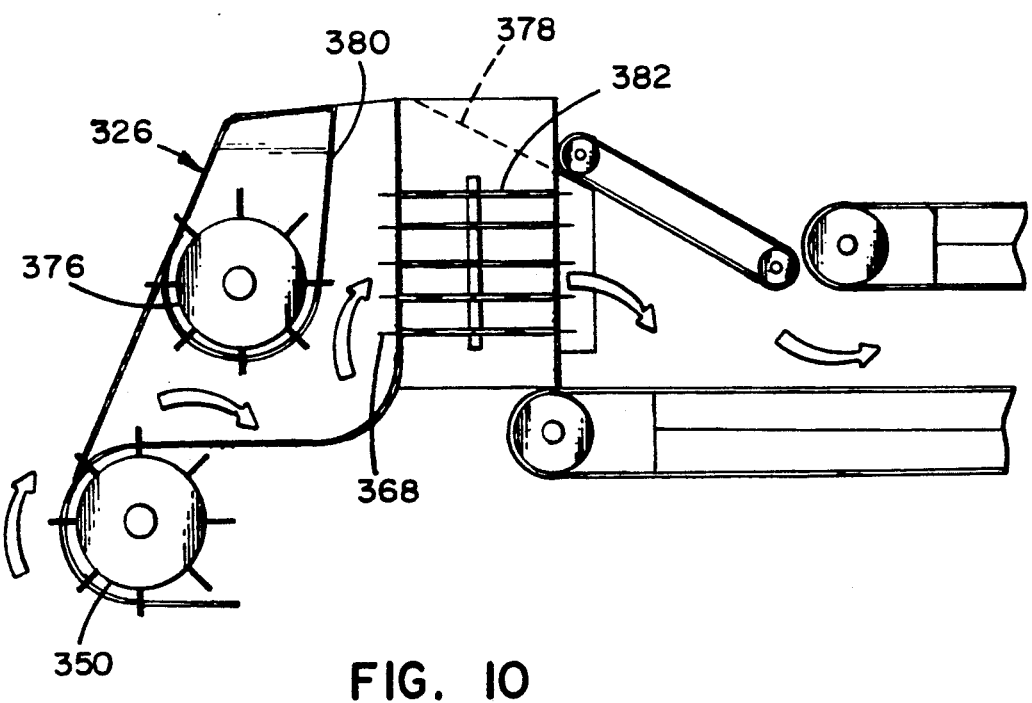
FIG. 10 is a side view of the first alternative embodiment of the pick-up mechanism shown in FIG. 9.

FIGS. 9 and 10 illustrate one particular alternative embodiment of a pick-up mechanism 326. The mechanism 326 removes the dividing wall 174 between the feed auger 178 and distribution conveyor belt 166 from the embodiment shown in FIG. 5. By removing the dividing wall 174, the forage crops are engaged by prongs 368 of distribution conveyor belt 382. The feed auger 178 and the feed belt 180 no longer necessary. A second toothed pick-up head 376 is provided to move the forage crops from the toothed pickup head 350 to the distribution conveyor belt 382 between shield 380 and housing 378.

Figure 14:
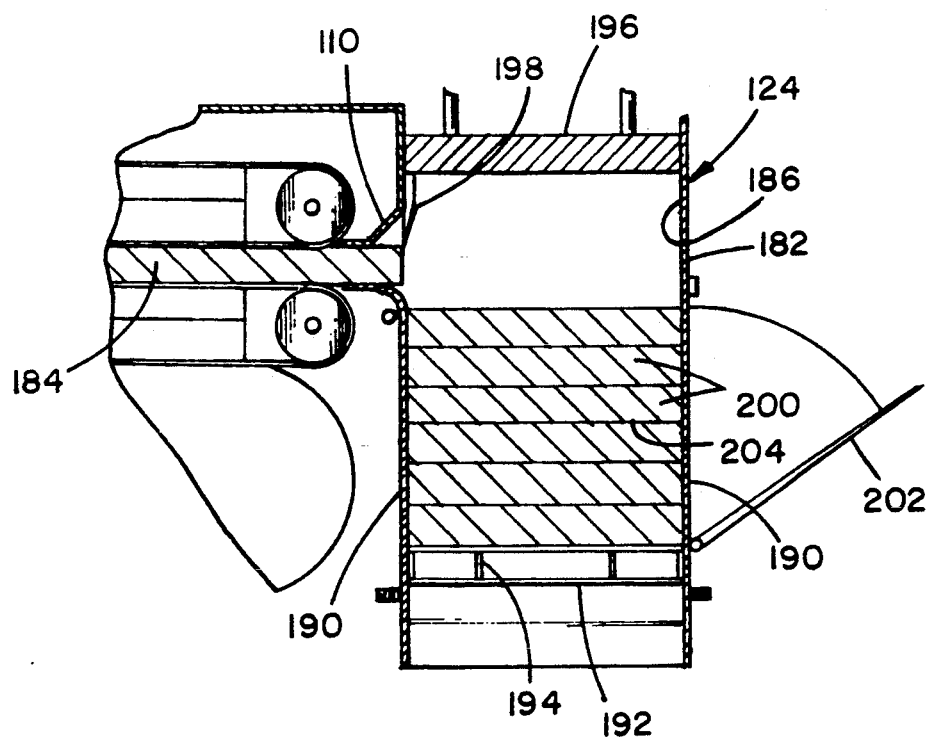
FIG. 14 is an enlarged side view of the baling mechanism of the harvester apparatus shown in FIG. 5.

The baling mechanism 124 of the harvester 100 shown in FIG. 5 and 6 is illustrated in enlarged view in Figure 14. A layer 184 of forage crops is shown in the housing 102. The layer 184 exits the housing 102 at the outlet 110. The baling mechanism 124 includes structure for converting the layer 184 of forage crops into a stack 204 of secured blocks 200 having generally rectangular shapes which rest on a pallet 194. It is anticipated that the pallets and bales could have various dimensions. In some applications, the bales may be as large as eight feet by eight feet by eight feet and may weigh several tons. Because a more dense product results and the product is formed into rectangular shaped blocks, the present invention facilitates easy transportation and storage of the harvested crops by reducing space requirements, by having an easier to handle shape, and by obtaining a more uniformly dried crop which lasts longer in storage without decay.

The baling mechanism 124 shown in FIG. 14 includes a frame 182 having an open top 186 and a plurality of elongated side members 190. The side members 190 define a perimeter larger than the blocks 200. A movable bottom 192 supports the pallet 194. The pallet 194 is disposed within perimeter of the side members 190 and is generally perpendicular to the side members. The bottom member 192 is movable from a first position adjacent the top of the frame to a second position away from the top of the frame. A ram 196 with a cutting blade 198 positioned above the top 186 of the frame moves toward and away from the top of the frame to separate a block 200 from the layer 184 and move the block into the frame 182 to form the column or stack 204 of blocks. A binding mechanism 202 securely attaches a plurality of blocks into a bale. It is to be appreciated that the bundling mechanism 202 can include various structures for securably attaching the stack 204 of blocks 200 to each other. The blocks may be tied together with string or the like such that the tying material surrounds an outer periphery of the bale. As an alternative, one or more rods or spindles may be driven through the blocks to retain the blocks on the pallet.

During the baling operation, the bottom member 192 is initially positioned in the first position adjacent the outlet 110. As the conveyor apparatus 122 moves the layer 184 such that a portion of the layer extends from the outlet 110, the ram 196 with the cutting blade 198 moves toward the layer. The cutting blade 198 separates the layer into the individual blocks 200. As each block 200 enters the interior of the perimeter of the side members 190, the bottom 192 moves away from the top 186 of the frame such that the next block 200 may be stacked on top of the previous block. After a predetermined number of blocks have entered the interior of the frame, the binding mechanism 202 securely attaches the blocks into a bale. This bale rests on the pallet 194 and is removed from the baling mechanism 124 and placed in the field for storage or picked up for transfer. Storage for the bales in the field may be effected by using a weather resistant, long life, flexible cover, such as glass fiber reinforced Teflon ®, or a more rigid water tight container to protect the forage crops from the weather, thereby eliminating the need for expensive sheds and expensive hauling. The pallets are of the type that are easily employed with conventional forklifts should the bales need transport to a different location.

Figure 15:
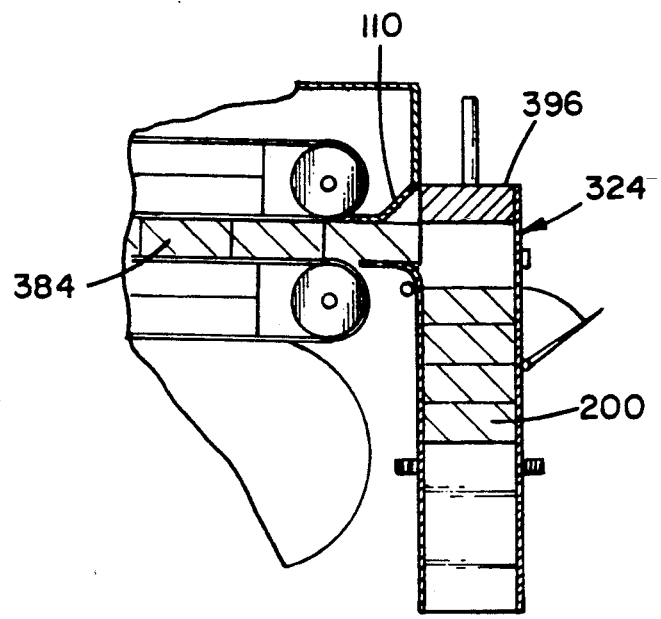
FIG. 15 is a side view of a first alternative embodiment of a baling mechanism for the harvester apparatus shown in FIG. 5.

FIG. 15 illustrates a first alternative embodiment of a baling mechanism 324 for use when the forage crops are incrementally compacted by an initial compactor mechanism as the forage crops enter the housing 102, such as by the initial compactor mechanisms 364,464 described above. A sensor operated ram 396 helps to separate the blocks as the layer 384 is moved through the outlet 110.

As shown in FIG. 6, the harvester 100 is provided with an alternator 206 for generating current to operate the mechanisms of the harvester 100, including the unit heaters 138 and the conveyor belts 148. The alternator 206 is preferably driven by the tractor or other prime mover through a power take-off or a belt from the prime mover. In the alternative, the various mechanisms could be driven directly from the prime mover.

Figure 16:
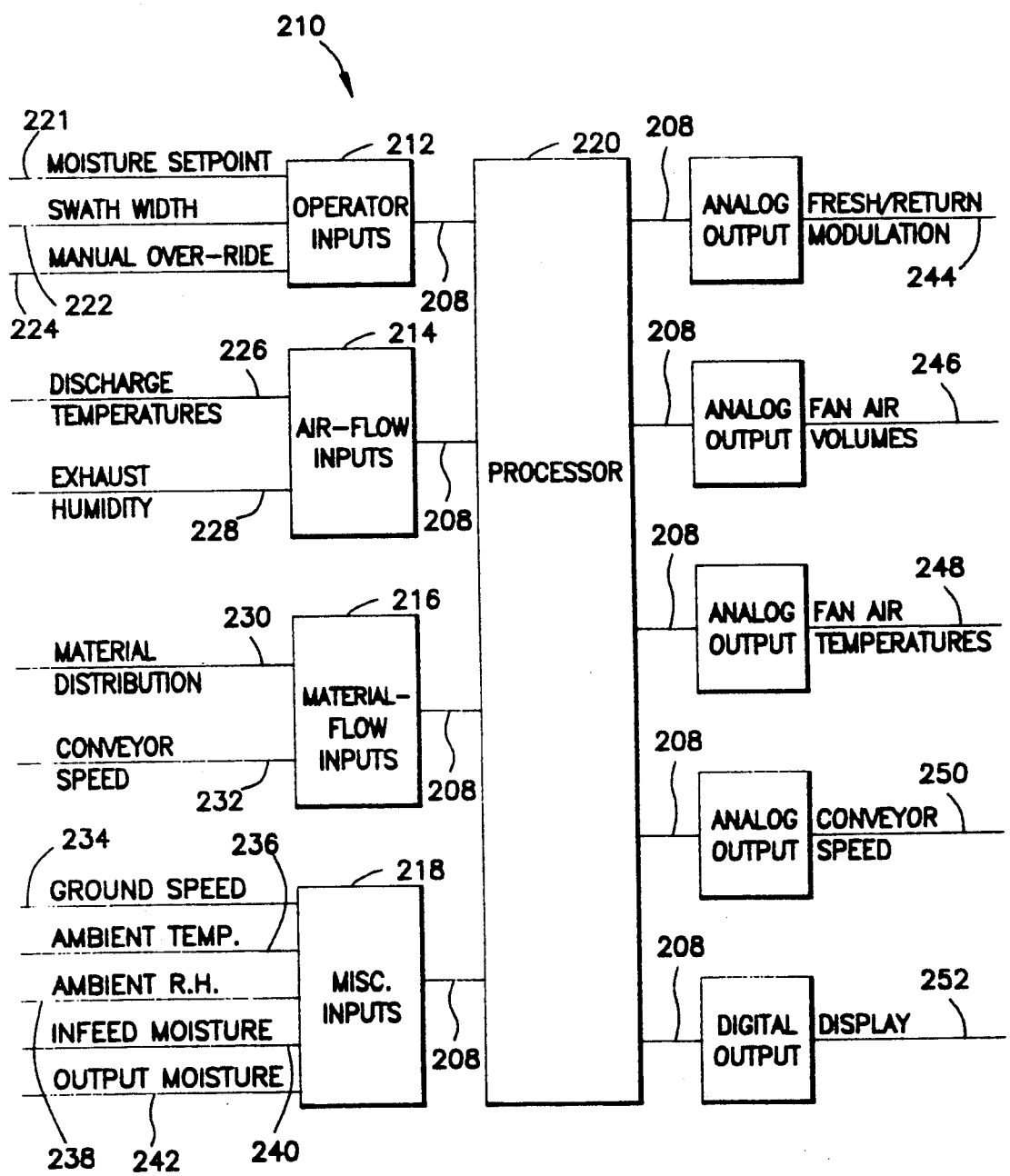
FIG. 16 is a block diagram view illustrating the control system for the harvester apparatus shown in Figure 5.

The harvester 100 preferably has control structure for controlling the drying process and the compacting process such that an optimal end product of dried and compacted forage crops is produced. The control structure can be either manually controlled or automatically controlled or both. In the preferred embodiment, a control system 210 is employed to automatically control the harvester 100. FIG. 16 illustrates the various inputs which are input to a processor 220 which controls the operation of the harvester and displays pertinent information to the harvester operator. The inputs to the control system can be divided into four basic categories: operator inputs 212, airflow inputs 214, forage crop flow inputs 216, and miscellaneous inputs 218. All inputs 212, 214, 216, and 218 provide information to the processing unit 220 which in turn performs the necessary calculations to provide outputs to control the operation of the harvester 100. The various inputs and outputs are connected to the processor 220 through electrical interconnection structure 208, which can be wire or other suitable material.

The operator inputs 212 include a desired final moisture level setting input 221 for the forage crops and a swath width input 222. These are input by the operator via an entry system such as a key pad (not shown). Control of the final moisture content of the forage crops is variable to permit the harvester 100 to produce dried and baled forage crops of varying moisture contents depending on the desired end uses of the product. For example, if the product is to be used for animal feed in the near future, the moisture content can be greater. If the product is intended for longer term storage, then the moisture content will be less.

A manual override input 224 exists to permit the operator to override any of the various input. As in many cases of automatic control, there are times when the automatic process needs to be controlled manually. Thus, the manual override 224 will allow manual input of the parameters required to run the harvester 100.

The remaining inputs are sensed by various sensors disposed on and in the harvester 100. The airflow inputs 214 include an airflow exhaust or discharge temperatures input 216 and an airflow exhaust humidity input 228, measured by conventional temperature and humidity measuring devices. The material flow inputs 216 include a material or forage crop distribution within the housing input 230, measured by pressure sensing apparatus. A conveyor speed input 232 can be measured with a tachometer. The miscellaneous inputs 218 include a ground speed input 234 of the harvester 100, an ambient temperature input 236, an ambient relative humidity input 238, an infeed moisture input 240 of the forage crops at the inlet 108, and an output moisture input 242 of the forage crops at the outlet 110.

The processor 220 computes the necessary settings for the various controls of the harvester 100 to produce an optimal final product. The settings controlled by the processor 220 include a fresh/return air modulation control 244, a fan air volume control 246, a fan air temperature control 248, and a conveyor speed control 250. The processor 220 also displays the various outputs to the operator via a display output 252. Since there are limitations due to the capacity of this system, the operator will also be signaled if these limitations are exceeded. In addition to the drying and compacting process itself, the processor 220 will also preferably control and monitor various other harvester functions such as ground speed, baling, pick-up, and safety functions.

The following discussion illustrates how the processor 220 might be employed to control the harvester functions to produce an optimal product. The operator initially inputs the desired output moisture 221 of the forage crops to the processor. The processor receives the inputs of the infeed moisture content 240, the output moisture content 242, and the conveyor speed 232. The processor in turn controls the fan airflow speed 246 and/or air temperatures 248 for each of the unit heaters 138, thereby controlling the final moisture level of the forage crops in a closed loop fashion. In the event of a slow down in the conveyor speed, the processor 220 will cause a corresponding decrease in temperature to offset the additional time required for the forage crops to complete a path through the harvester. Alternatively, an increase of moisture sensed by the infeed moisture sensor might prompt a corresponding increase in the drying temperatures.

Control of the rate of the flow of the forage crops through the harvester will be typically be based on the volume of material or forage crops entering the system. The material distribution input 230 will detect a presence of material in the harvester, the distribution of the forage crops, and its density and send a signal to the processor 220. The processor 220 will take the inputs from which the proper conveyor speed can be calculated and set by the processor. Again, the output will be controlled in a closed loop fashion. For example, an increase of material entering the harvester will cause an increase in the conveyor speed, while reduced material input will cause a corresponding decrease in conveyor speed.

An option for this system would be to also control the proportion of recirculated air versus fresh air heated by the unit heaters 138. Ambient conditions would be monitored by the processor 220 as would the exhaust air. When conditions changed, the appropriate proportions could be altered by the processor 220.

Having read the above description, it should be understood, however, that even though numerous characteristics and advantages of the invention have been set for the in the foregoing description, together with details of the structure and function of the invention, the disclosure is illustrative only, and changes may be made in detail, especially in matters of shape, size and arrangement of parts within the principles of the invention to the full extend indicated by the broad general meaning of the terms in which the appended claims are expressed.

What is claimed is:

1. An apparatus for drying forage crops, comprising:
   a portable housing supported on wheels;
   drying means disposed in the housing for drying forage crops;
   inlet means proximate a first end of the housing for feeding forage crops into the drying means;
   outlet means proximate a second end of the housing for exiting the forage crops from the drying means; and
   a conveyor apparatus disposed in the housing, the conveyor apparatus passing through the drying means and linking the inlet means to the outlet means, the conveyor apparatus having a channel shape of decreasing cross-sectional area in the direction along the conveyor apparatus toward the outlet means, the conveyor apparatus having means for conveying the forage crops from the inlet means to the outlet means, the drying means, the means for conveying, and the channel-shape of the conveyor apparatus cooperating to produce a dried and compacted layer of forage crops having a moisture content less than the moisture content of the forage crops at the inlet means and further having a density greater than the density of the forage crops at the inlet means.

2. The apparatus of claim 1, wherein the means for conveying includes at least one conveyor belt.

3. The apparatus of claim 1, wherein the conveyor apparatus has a convoluted shape.

4. The apparatus of claim 1, wherein the drying means includes a forced air system.

5. The apparatus of claim 4, wherein the forced air system includes a plurality of heaters, with each heater supplying air heated to a different temperature.

6. The apparatus of claim 1, further comprising pick-up head means for picking up forage crops.

7. The apparatus of claim 1, further comprising baling means for packaging the forage crops into bales as the forage crops exit the drying means.

8. The apparatus of claim 1, wherein the channel shape cross-sectional area decreases at a greater rate proximate the inlet means than proximate the outlet means.

9. An apparatus for drying forage crops, comprising:
a portable hosing supported on wheels;
drying means disposed in the housing for drying forage crops;
inlet means proximate a first end of the housing for feeding forage crops into the apparatus;
outlet means proximate a second end of the housing for exiting forage crops from the apparatus;
conveying means disposed in the housing for moving the forage crops from the inlet means through the drying means to the outlet means; and
distributing means disposed in the housing intermediate the inlet means and the drying means, the distributing means substantially evenly distributing the forage crops across a width of the conveying means so as to have a density more uniform and greater than a density of the forage crops at the inlet means.

10. The apparatus of claim 9, further comprising baling means disposed on the housing for packaging the forage crops into bales as the forage crops exit the drying means.

11. The apparatus of claim 9, wherein the distributing means includes a compacting area, the forage crops accumulating in the compacting area during distribution to a predetermined density which is greater than a density of the forage crops at the inlet means.

12. The apparatus of claim 9, wherein the distributing includes a distribution conveyor belt having an endless belt and a plurality of prongs extending from the belt and engaging the forage crops during distribution.

13. The apparatus of claim 9, wherein the distributing means includes a rotating auger, the auger engaging the forage crops during distribution.

14. The apparatus of claim 9, wherein the distributing means includes a reciprocating plate, the plate engaging the forage crops during distribution.

15. A forage crop dryer and baler apparatus, comprising:
a portable housing;
drying means disposed in the housing for drying forage crops;
inlet means proximate a first end of the housing for feeding forage crops into the drying means;
outlet means proximate a second end of the housing for exiting forage crops from the drying means;
conveying means disposed in the housing for conveying the forage crops from the inlet means through the drying means to the outlet means;
compacting means disposed in the housing for compacting the forage crops before the forage crops exit the drying means, the compacting means forming the forage crops into a single layer of predetermined thickness having a density greater than a density of the forage crops at the inlet means; and
baling means adjacent the outlet means for separating the single layer into a plurality of blocks of predetermined length, stacking a predetermined number of the blocks into a column, and securing the column of stacked blocks into a bale.

16. The forage crop dryer and baler apparatus of claim 15, which is self-propelled.

17. The forage crop dryer and baler apparatus of claim 15, which is adapted for being towed by a primary mover such as a tractor.

18. A forage crop dryer and baler apparatus of claim 15, wherein the drying means includes a forced air system.

19. The forage crop dryer and baler apparatus of claim 18, wherein the forced air system includes a plurality of heaters, each heater supplying air heated to a different temperature, the forced air system further including a plurality of fans and duct, the fans and duct distributing the heated air to the housing dry the forage crops.

20. An apparatus for drying forge crops, comprising:
a portable housing supported on wheels;
drying means disposed in the housing for drying forage crops;
inlet means proximate a first end of the housing for feeding forage means into the apparatus;
outlet means proximate a second end of the housing for exiting forage crops from the apparatus;
conveying means disposed in the hosing for moving the forage crops from the inlet means through the drying means to the outlet means; and
distributing means disposed in the housing intermediate the inlet means and the drying means, the distributing means substantially evenly distributing the forage crops across a width of the conveying means so as to have a density more uniform than a density of the forage crops at the inlet means, the distributing means including a compacting area, the forage crops accumulating in the compacting area during distribution to a predetermined density which is greater than a density of the forge crops at the inlet means.

21. An apparatus for drying forage crops, comprising:
a portable housing supported on wheels;
drying means disposed in the housing for drying forage crops;
inlet means proximate a first end of the housing for feeding forage crops into the apparatus;
outlet means proximate a second end of the housing for exiting for crops from the apparatus;
conveying means disposed in the housing for moving the forage crops from the inlet means through the drying means to the outlet means; and
distributing means disposed in the housing intermediate the inlet means and the drying means, the distributing means substantially evenly distributing the forage crops across a width of the conveying means so as to have a density more uniform than a density of the forage crops at the inlet means, the distributing means including a rotating auger, the auger engaging the forage crops during distribution.

22. An apparatus for drying forage crops, comprising:
a portable housing supported on wheels;

drying means disposed in the housing for drying forage crops;

inlet means proximate a first end of the housing for feeding forage crops into the apparatus;

outlet means proximate a second end of the housing for exiting forage crops from the apparatus;

conveying means disposed in the housing for moving the forage crops from the inlet means through the drying means to the outlet means; and distributing means disposed in the housing intermediate the inlet means and the drying means, the distributing means substantially evenly distributing the forage crops across a width of the conveying means so as to have a density more uniform that a density of the forage crops at the inlet means, the distributing means including a reciprocating plate, the plate engaging the forage crops during distribution.

* * * * *

UNITED STATES PATENT AND TRADEMARK OFFICE
CERTIFICATE OF CORRECTION

PATENT NO. : 5,105,563

DATED : April 21, 1992

INVENTOR(S) : Fingerson et al.

It is certified that error appears in the above-indentified patent and that said Letters Patent is hereby corrected as shown below:

```
Column 3, line 60
     DELETE "bail" and INSERT therefor --bale--.

Column 6, line 14
     DELETE "lever" and INSERT therefor --leveler--.

Column 6, line 65
     DELETE "crop" and INSERT therefor --crops--.

Column 7, line 47
     DELETE "give" and INSERT therefor --given--.

Column 8, line 1
     DELETE "drys" and INSERT therefor --dries--.

Column 8, line 21
     INSERT --of-- after the word "use".

Column 9, lines 3 and 4
     DELETE "conveyer" and INSERT therefor --conveyor--

Column 10, line 5
     DELETE "crop" and INSERT therefor --crops--.

Column 10, line 31
     INSERT --and-- after the numeral "148".
```

UNITED STATES PATENT AND TRADEMARK OFFICE
CERTIFICATE OF CORRECTION

PATENT NO. : 5,105,563
DATED : April 21, 1992
INVENTOR(S) : Fingerson et al.

It is certified that error appears in the above-indentified patent and that said Letters Patent is hereby corrected as shown below:

```
Column 11, line 27
     DELETE "crop" and INSERT therefor --crops--.

Column 13, line 15 and Column 13, line 48
     DELETE "Fig." and INSERT therefor --Figs.--.

Column 15, line 25
     DELETE "input" and INSERT therefor --inputs--.

Column 16, line 10
     DELETE "be" after the word "typically".

Column 16, line 32
     DELETE "for the" and INSERT therefor --forth--.

Column 16, line 38
     DELETE "extend" and INSERT therefor --extent--.

Column 17, line 18 (claim 9)
     DELETE "hosing" and INSERT therefor --housing--.

Column 18, line 25 (claim 20)
     DELETE "forge" and INSERT therefor --forage--.

Column 18, line 30 (claim 20)
     DELETE "means" and INSERT therefor --crops--.
```

UNITED STATES PATENT AND TRADEMARK OFFICE
CERTIFICATE OF CORRECTION

PATENT NO. : 5,105,563

DATED : April 21, 1992

INVENTOR(S) : Fingerson et al.

It is certified that error appears in the above-indentified patent and that said Letters Patent is hereby corrected as shown below:

Column 18, line 54 (claim 21)
 DELETE "for" (2nd occurrence) and INSERT therefor
 --forage--.

Signed and Sealed this

Fourth Day of January, 1994

Attest:

BRUCE LEHMAN

*Attesting Officer*  *Commissioner of Patents and Trademarks*